(12) United States Patent
Figueroa et al.

(10) Patent No.: US 7,921,114 B2
(45) Date of Patent: Apr. 5, 2011

(54) CAPTURING AND COMBINING MEDIA DATA AND GEODATA IN A COMPOSITE FILE

(75) Inventors: Joseph Figueroa, Kirkland, WA (US); Meir E Abergel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 432 days.

(21) Appl. No.: 12/100,415

(22) Filed: Apr. 10, 2008

(65) Prior Publication Data
US 2009/0259686 A1   Oct. 15, 2009

(51) Int. Cl.
*G06F 7/00* (2006.01)
*G06F 17/30* (2006.01)

(52) U.S. Cl. ........ 707/743; 707/788; 707/803; 701/201; 701/209; 701/213

(58) Field of Classification Search .................. 707/789, 707/780, 741, 758, 803, 737, 743, 788; 701/207, 701/200, 213, 241, 215, 201, 209; 715/747, 715/757, 738; 382/218, 115, 100, 176
See application file for complete search history.

(56) References Cited

U.S. PATENT DOCUMENTS

| | | | | |
|---|---|---|---|---|
| 5,802,492 | A * | 9/1998 | DeLorme et al. ........... | 455/456.5 |
| 6,182,010 | B1 * | 1/2001 | Berstis ........................... | 701/211 |
| 6,675,081 | B2 * | 1/2004 | Shuman et al. ................. | 701/48 |
| 6,885,939 | B2 * | 4/2005 | Schmidt et al. ............... | 701/211 |
| 7,107,286 | B2 * | 9/2006 | Burnett ......................... | 701/200 |
| 7,127,453 | B1 * | 10/2006 | Frazier et al. ................. | 701/209 |
| 7,254,249 | B2 * | 8/2007 | Rhoads et al. ................. | 382/100 |
| 7,272,501 | B2 * | 9/2007 | Dorfman et al. .............. | 701/213 |
| 7,286,931 | B2 * | 10/2007 | Kawasaki ...................... | 701/209 |
| 2003/0061369 | A1 * | 3/2003 | Aksu et al. ..................... | 709/231 |
| 2005/0232352 | A1 * | 10/2005 | Siemens et al. .......... | 375/240.12 |
| 2005/0261823 | A1 * | 11/2005 | Huang et al. .................. | 701/200 |
| 2005/0273725 | A1 * | 12/2005 | Russon et al. ................ | 715/780 |
| 2006/0064716 | A1 * | 3/2006 | Sull et al. ......................... | 725/37 |
| 2006/0104397 | A1 * | 5/2006 | Lottis et al. ................... | 375/372 |
| 2006/0155466 | A1 * | 7/2006 | Kanda et al. .................. | 701/209 |
| 2007/0055441 | A1 * | 3/2007 | Retterath et al. .............. | 701/200 |
| 2007/0061071 | A1 * | 3/2007 | Torii ............................... | 701/209 |
| 2007/0118281 | A1 * | 5/2007 | Adam et al. ................... | 701/211 |
| 2007/0129888 | A1 * | 6/2007 | Rosenberg .................... | 701/213 |
| 2007/0244634 | A1 * | 10/2007 | Koch et al. .................... | 701/207 |
| 2008/0307311 | A1 * | 12/2008 | Eyal ............................... | 715/733 |

(Continued)

OTHER PUBLICATIONS

Arno Schart—"Towards the geospatial web: Media Platforms for managing geotagged knowledge repositories"—The Geospatial Wed, advanced information and knowledge processing, 2007, part I, (pp. 3-14).*

(Continued)

*Primary Examiner* — John Breene
*Assistant Examiner* — Anh Ly
(74) *Attorney, Agent, or Firm* — Alleman Hall McCoy Russell & Tuttle LLP

(57) ABSTRACT

Systems and methods are provided for capturing and combining media data and geodata into a composite file. The system may include a media data capture module configured to capture media data at a plurality of geographic locations along a path in a geographic area, and to store the media data in a media data stream. The system may further include a geodata capture module configured to capture geodata indicating the geographic locations along the path at which the media data was captured. The system may also include a multiplexing module for interleaving the media data and the geodata into a composite file.

17 Claims, 3 Drawing Sheets

U.S. PATENT DOCUMENTS

2009/0063045 A1* 3/2009 Figueroa et al. .............. 701/210

OTHER PUBLICATIONS

Geoffrey Dutton—"Encoding and handling geospatial data with hierarchical triangular meshes"—proceeding of $7^{th}$ International Symposium—1996 (spatial-effects.com (pp. 1-14).*

"OziPhotoTool v2.7", Nov. 17, 2005, FileHeap.com, pp. 3.

Christel, et al., "Interactive Maps for a Digital Video Library", 2000, IEEE, pp. 60-67.

"Video Mapping", 1998-2007, Global Findability, Inc., pp. 2.

"Geocoding Photos", Richard Akerman, 2006-2007, pp. 8.

"Geocode Digital Images with Latitude, Longitude, and Altitude Information," retrieved at <http://www.bluesofts.com/download/607/21852/RoboGEO.html>, Access date: Jan. 2, 2008, 2 pages.

* cited by examiner

CAPTURING AND COMBINING MEDIA DATA AND GEODATA IN A COMPOSITE FILE

BACKGROUND

Digital media, such as audio and video, have proliferated in recent years, as have global positioning system technologies enabling the tracking of the geographic position of a device. However, capturing and storing both digital media and the geographic position at which the media was captured remains a challenge. One approach that has been proposed is to mount both a camera and a Global Positioning Satellite (GPS) receiver, on a vehicle. Time-stamped images captured by the camera and time-stamped geographic locations (e.g., latitude and longitude) recorded by the GPS receiver may be separately stored on disk and later correlated via their respective time stamps.

There are several drawbacks with this approach. For example, this approach involves storage of data in different files, increasing storage size and decreasing the portability of the data. In addition, playback of the data may be inefficient since processor and file access time is required to look up corresponding data in each of the files.

SUMMARY

Systems and methods are provided for capturing and combining media data and geodata into a composite file. The system may include a media data capture module configured to capture media data at a plurality of geographic locations along a path in a geographic area, and to store the media data in a media data stream. The system may further include a geodata capture module configured to capture geodata indicating the geographic locations along the path at which the media data was captured. The system may also include a multiplexing module for interleaving the media data and the geodata into a composite file.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
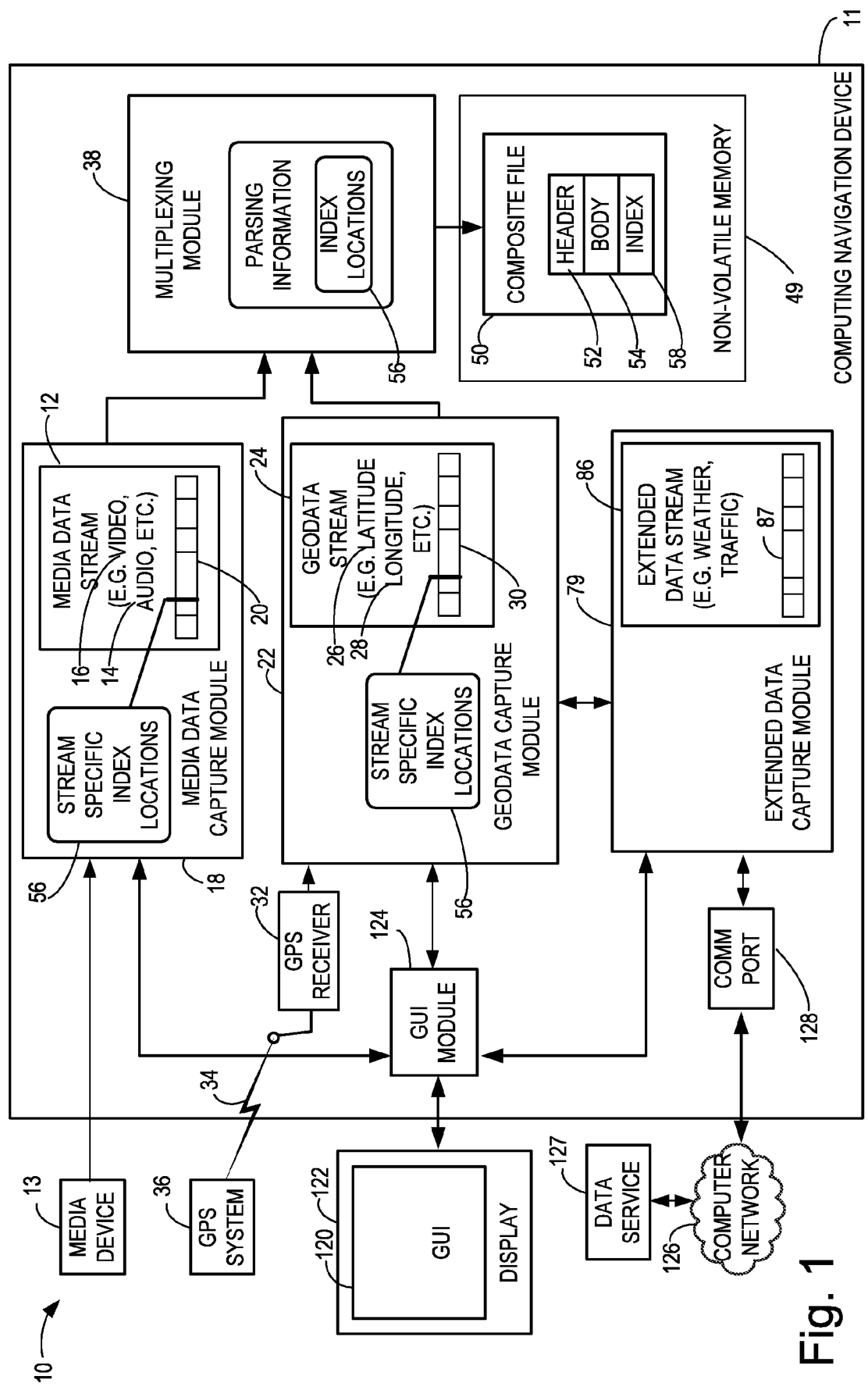
FIG. 1 is a schematic view illustrating a system for capturing and combining media data and geodata.

FIG. 1 illustrates a system 10 including a computing navigation device 11 configured to capture and combine media data 12 and geodata 24. The media data 12 may include audio data 14 and/or video data 16, and may be captured with a media device 13 such as an audio recorder, video camera, or the like.

System 10 may include a media data capture module 18 configured to capture media data at a plurality of geographic locations along a path in a geographic area, and to store the media data in a media data stream 20. The media data stream 20 may be stored in one of various formats, including but not limited to Windows Media Video (WMV), Moving Picture Experts Group (MPEG) and Audio Video Interleave (AVI) formats.

The system 10 may also include a geodata capture module 22 configured to capture geodata 24 indicating the geographic locations along the path at which the media data was captured. Geodata 24 includes geographic information associated with each of the plurality of geographic locations along the path. For example, geodata 24 may identify a latitude 26 and a longitude 28 of each of the geographic locations. In some embodiments, geodata 24 may also include a compass direction for each of the geographic locations. By way of example, the media may be captured with a video camera rotatably mounted to a tripod or held by a person moving through the geographic area, and the geodata may indicate the cardinal direction in which the tripod was pointed, or the direction of travel along the path. Geodata 24 may also include altitude information indicating an altitude at which the media was captured.

Further, geodata 24 may also identify one or more of a date and a time during which the geodata was captured. The date and time may be retrieved from a clock on the computer navigation device 11, from embedded meta data within the media data 12, or from a data service 127 via a computer network 126 such as the Internet. The geodata capture module 22 may be configured to store the geodata 24 as a geodata stream 30.

The geodata 24 may be captured using a Global Positioning System (GPS) receiver 32 configured to receive signals 34 from a group of artificial earth satellites in the Global Navigation Satellite System (GNSS) 36. The GPS receiver 32 is configured to determine its position, and therefore a user's position, based on signals 34, and send the determined position as geodata 24 to geodata capture module 22. Alternatively, other positioning methods may be used, including methods that may utilize terrestrial positioning signals.

The media data 12 and geodata 24 may be multiplexed and stored in a composite file 50 in non-volatile memory 49 of computing device 11. System 10 may also include a graphical user interface module 124 configured to display a graphical user interface 120 on a display 122 associated with the computing navigation device 11, and the composite file 50 may be configured to be displayed on the graphical user interface 120. It will be appreciated that the composite file 50 may be of a streaming file type or a downloadable file type, and thus may be streamed or downloaded to a remote computing device for display.

The system 10 may include a multiplexing module 38 for interleaving the media data 12 and the geodata 24 into the composite file 50. The geodata stream 30 may be interleaved with the media data stream 20, for example, in an Advanced Systems Format (ASF) stream. Alternatively other file formats may be used, for example MPEG-2. Within the media data stream 20, the geodata 24 may be inserted before or after the media data 24 to which it relates, and in some embodiments may be inserted immediately before or after such related data.

The composite file 50 may include a header 52 and a body 54. The header 52 may describe the content of the stream contained in the composite file 50, and may contain parsing information to describe how to parse the body 54 as a streaming file. The parsing information may come from, for example, stream specific index locations 56 that may be captured by the media data capture module 18, and the geodata capture module 22. The body 54 of the composite file 50 may contain the physical streams data. The geodata 12 and media data 24 may be interleaved, sliced in payloads, and embedded into packets. The composite file 50 may also include a composite file-specific index 58, which may be used to provide time-based random access into the composite file 50 stream.

Figure 3:
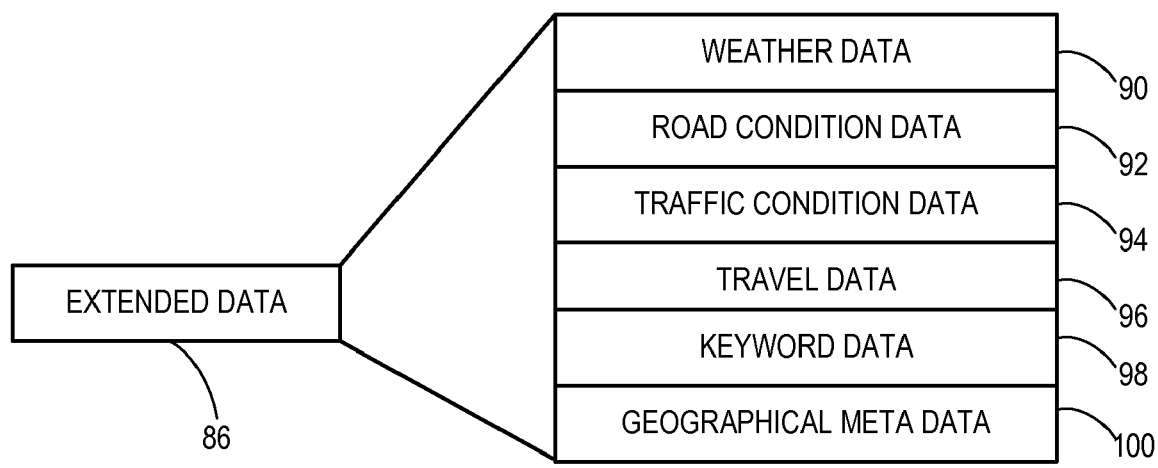
FIG. 3 is a schematic view illustrating examples of extended data of the composite file of FIG. 1.

The system 10 may further include an extended data capture module 79 configured to capture extended data 86 to be combined with the geodata into the composite file 50 by the multiplexing module 38. The extended data capture module 79 may be configured to communicate through a communications port 128 to download the extended data 86 from a server at a data service 127 via a computer network 126 such as the Internet, and to store the extended data 86 in an extended data stream 87. Alternatively, the extended data 86 may be inputted by a user, received by the graphical user interface 120, and sent to the extended data capture module 79. Example types of extended data 86 include weather, traffic, and other information, as illustrated in FIG. 3 and described below. It will be appreciated that graphical user interface 120 may also be configured to provide user input to media data capture module 18 and geodata capture module 22, and to display the composite file 50 that is produced by multiplexing module 38.

Figure 2:
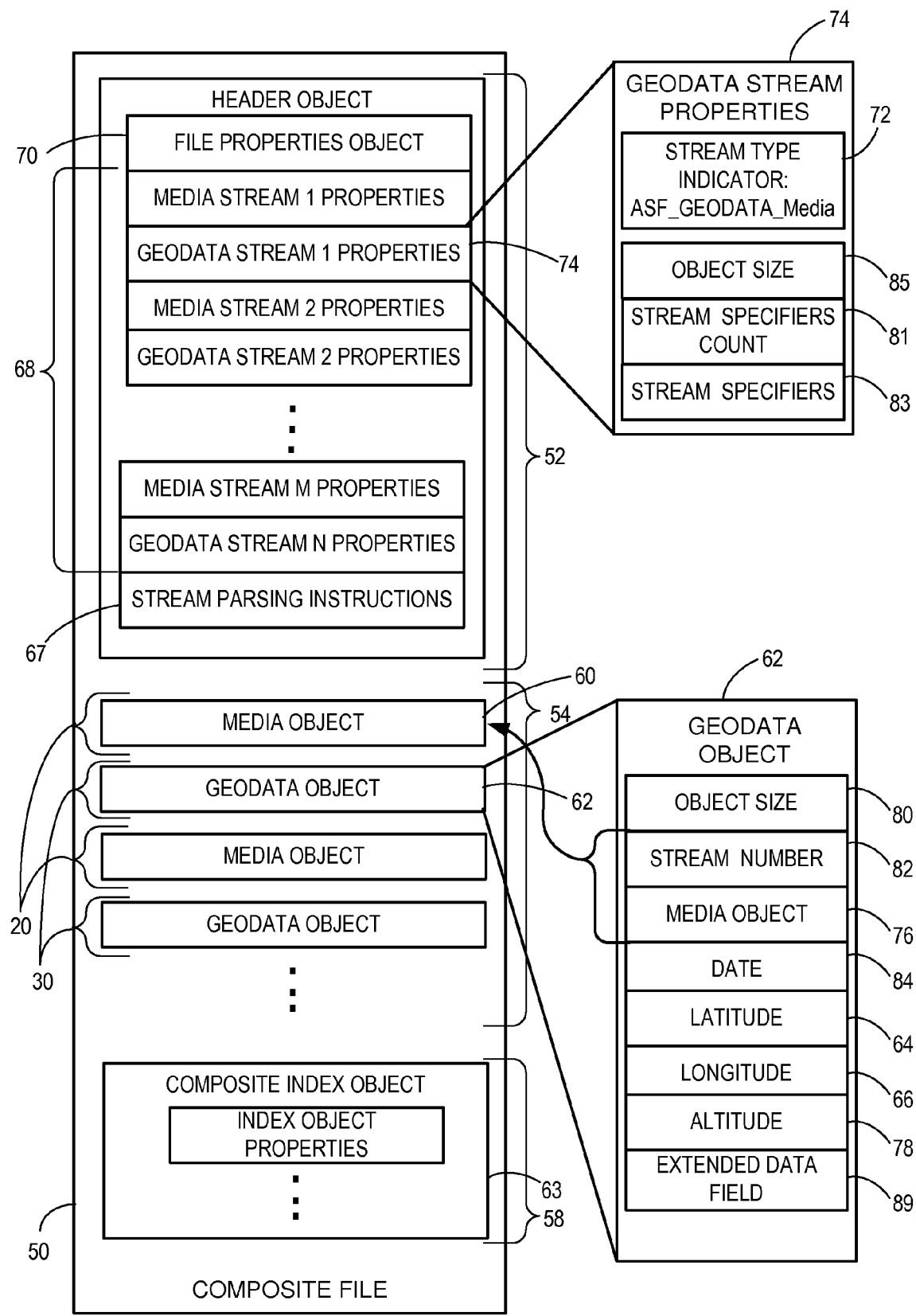
FIG. 2 is a schematic view illustrating a composite file of the system of FIG. 1, the composite file including media data and geodata.

FIG. 2 is a schematic view illustrating the composite file 50 that may be formed using the system 10 illustrated in FIG. 1. As described above, composite file 50 may be structured according to the Advanced Systems Format (ASF) file format, and may include a header 52 containing information about the contents of the file, a body 54 containing various streams and their component data objects, and an optional composite file-specific index 58 for use, for example, in searching the composite file.

The header 52 contains information about the composite file 50 as a whole, and information about each individual stream contained within the composite file 50. Thus, the header 52 may include a file properties object 70 to identify the composite file as an ASF stream, and also may include identifying objects 68 that serve to identify properties of the various streams that are included in the composite file 50. The identifying objects 68, it will be understood, may define one or more media streams 20, such as audio and video streams, and one or more geodata streams 30 within the composite file 50.

To define a geodata stream 30, the header 52 may include a geodata stream properties object 74, which in turn includes a geodata stream type indicator 72, such as the string ASF_GEODATA_Media, to indicate that a stream is included in the composite file 50, which is of a type that contains geodata. The header 52 may also include a stream parsing object 67 containing stream parsing instructions for parsing the data objects in each stream. Each data object in each stream in turn may include linking information associating it with its parent stream.

Body 54 may include the data objects for the various streams defined by header 52. For example, body 54 may include a media stream 20 including one or more media objects 60 containing media data 12, and a geodata stream 30 including one or more geodata objects 62 containing geodata 24. The geodata 24 may identify the geographic location, for example by latitude and longitude, at which the media data 12 was captured. Each of the one or more geodata objects 62 may be respectively related to a corresponding one or more media objects 60, to thereby provide a mechanism by which the geographic location at which the media data 12 was captured may be stored and referenced. For convenient storage, playback, and transmission, it will be appreciated that the data objects in the body 54 may be packetized, time-stamped, and interleaved according to the ASF file format.

As discussed above, the one or more media streams 20 may include one or more video streams and/or one or more audio streams. Each media object 60 in the video stream may represent a video frame, and each media object 60 in the audio stream may represent a length of audio data, for example 250 ms. Geodata objects 62 may be interleaved among the audio objects and video objects for quick access and playback.

The composite file 50 may also include a composite index object 63 which functions as the composite file-specific index 58. Composite file-specific index 58 may be used to facilitate searching and scrubbing of the file, and may be organized by clock time, frames, and time codes, according to the ASF file format.

Turning to the structure of the geodata stream file properties object 74 described above, this object may be of the structure shown in Table 1, as illustrated in FIG. 2.

TABLE 1

| Field Name | Field Type | Size (bits) |
| --- | --- | --- |
| Object Size | QWORD | 64 |
| Stream Specifiers Count | WORD | 16 |
| Stream Specifiers | Variable | See below |

The above listed fields may be defined as follows. The Object Size field 85 may specify the size, in bytes, of the geodata stream properties object 74. A 64 bit field type of QWORD may be used to hold this data, for example. Alternatively, a 32 bit field or other size may be employed.

The Stream Specifiers Count field 81 may specify the number of entries in an Index Specifiers 83 list of the composite file. A 16 bit field type of WORD may be used to hold this data, for example, which may be typically assigned values of one or greater.

The Streams Specifiers 83 field may include one or more Index Specifier entries, of the structure shown below in Table 2.

TABLE 2

| Field Name | Field Type | Size (bits) |
| --- | --- | --- |
| Stream number | WORD | 16 |

Turning to the structure of each geodata object 62, these objects may be structured to store various information about the geodata 24, and may include information regarding how the geodata 24 is related to a media object 60. Table 3 illustrates an example data structure for geodata object 62.

TABLE 3

| Field Name | Field Type | Size (bits) |
| --- | --- | --- |
| Object size | QWORD | 64 |
| Stream number | WORD | 16 |
| Media object | WORD | 16 |
| Date | QWORD | 64 |
| Latitude | DWORD | 32 |
| Longitude | DWORD | 32 |
| Altitude | DWORD | 32 |
| Extended data | Variable | Variable (see below) |

Referring now to FIG. 2, and to Table 3, the fields of the geodata object 62 may be defined as follows. The geodata object 62 may include an object size field 80 indicating the size of the object, including any extended data. In the depicted embodiment, an object size of 256 bits is used if no extended data is included. An object of this size may be included in a one packet. Larger geodata objects 62 may be packetized among several packets according to the ASF file format.

The mechanism for linking each geodata object 62 to a corresponding media object 60 is found in stream number field 82 and media object field 76 of the geodata object 62. Stream number field 82 may specify the media stream to which the geodata object 62 relates, for example by a stream number indicating a particular audio stream or video stream. The media object field 76 may contain a media object identifier such as a pointer, identifying a corresponding media object within the stream identified in the stream number field 82, to which the packet relates. In this way each of the geodata objects 62 may identify the media object 60 to which it relates.

The geodata object 62 may include a date field 84 to specify the date and time at which the media has been captured. The date value may be given in a suitable format, such as Coordinated Universal Time (Greenwich Mean Time). The value of this field may be invalid if a broadcast flag bit in a flags field of the date field is set to 1, indicating that broadcast signals for Coordinated Universal Time are not being received by the computing navigation device.

The geodata object 62 may include a latitude field 64, which may include a latitude value specifying the latitude at which the media has been captured. The latitude field 64 may be of a 32 bit (four byte) field of the type DWORD, or other suitable type and length. The degree, minute, and second of latitude may be stored in successive bytes of the field.

The geodata object 62 may further include a longitude field 66, which may include a longitude value specifying the longitude at which the media has been captured. The latitude field may be a 32 bit DWORD field type, or other suitable type and length. The degree, minute, and second of longitude may be stored in successive bytes of the field, for example.

An altitude field 78 may specify the altitude at which the media has been captured. The data may be given any suitable format, such as in millimeters above or below sea level, and may be expressed as an unsigned 32 bit integer, of a DWORD data type, or other suitable type and length.

Finally, an extended data field 89 of a suitable type and length may be provided for the storage of any extended data 86. It will be appreciated that in the event that no extended data 86 is captured, this field may be omitted. Details of the extended data 86 stored in extended data field 89 are given below.

FIG. 3 is a schematic view illustrating examples of extended data 86 to be stored in extended data field 89. The extended data 86 may include one or more of weather data 90 (e.g., wind speed and direction, temperature, precipitation, cloud conditions, etc.), road condition data 92 (e.g., road surface condition, construction status, speed limit, curviness, grade, etc.), traffic condition data 94 (e.g., congested, clear, etc.), travel data 96 (e.g., points of interest, historical data, etc.) keyword data 98, and other geographical meta data 100. The extended data 86 is accessible by geographic location and time, thus enabling the extended data capture module 79 to download extended data corresponding to a geographic location and date and time at which media 12 was captured. For example, for media 12 including a video of a road to a ski resort, geodata 24 may indicate the latitude, longitude, time, and date at which the video was captured, and the extended data capture module may be configured to download from a data service 127 and save as extended data 86 the weather conditions (e.g., snowing) at the time the video was captured. Alternatively, the user may input the weather condition "snowy" via graphical user interface 120 after the media is captured. These approaches facilitate, for example, later computerized search for media that include videos of the same road during snowy weather.

Figure 4:
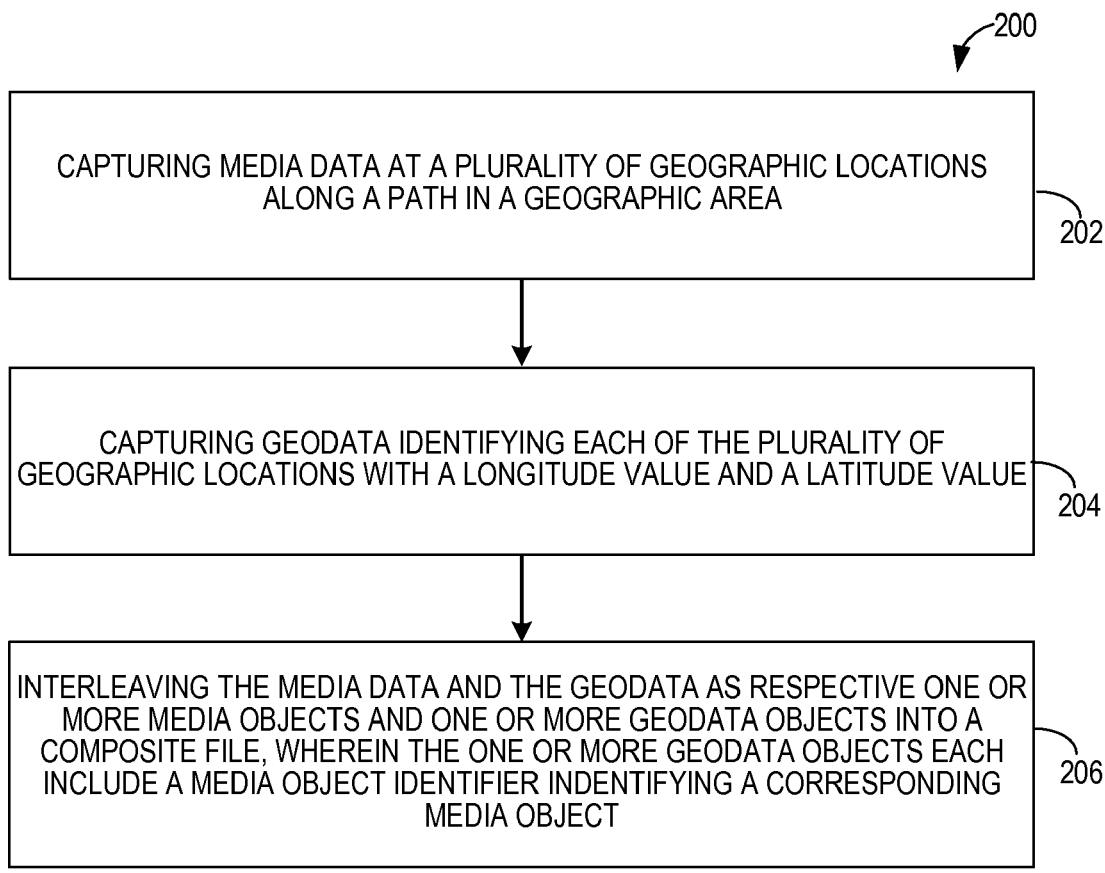
FIG. 4 is a flowchart illustrating one embodiment of a method for capturing and combining geodata with media data.

FIG. 4 is a flowchart illustrating an embodiment of a method 200 for combining geodata with media data. The method 200 may include, at 202, capturing media data at a plurality of geographic locations along a path in a geographic area. At 204, the method may include capturing geodata identifying each of the plurality of geographic locations with a longitude value and a latitude value. At 206, the method may include interleaving the media data and the geodata as respective one or more media objects and one or more geodata objects into a composite file, wherein the one or more geodata objects each include a media object identifier identifying a corresponding media object. As discussed above, the media data may include video and/or audio and may be stored in a media data stream prior to interleaving. The geodata may also be stored in a geodata stream prior to interleaving.

The method may further include forming a header object 52 in the composite file 50, which describes the contents of the composite file 50 and identifies the one or more media objects 60 forming a media stream and the one or more geodata objects 62 forming a geodata stream. Each of the media objects and geodata objects may further be packetized, time-stamped, and interleaved according to the ASF file format, and stream parsing instructions may be stored in the header 52, as described above. The geodata objects 62 and media objects 60 may be linked, for example, by providing a stream identifier and a media object identifier in each of the geodata objects, which may be used to respectively identifier a media stream and a media object within the media stream, to which the geodata packet relates. This facilitates linkage of the geodata and media data for playback, for example.

Further, as discussed above it will be appreciated that the geodata captured at 204 may additionally include other data such as altitude, time, date, extended data, etc., as described above, which may facilitate the search and playback of media data by geographic location, time, date, weather, etc. Finally, the method may also include displaying the composite file on a graphical user interface displayed on a display associated with a computing navigation device.

The systems and methods described herein may be utilized to store captured media data, geodata, and extended data in a file format that is easily accessible for search and playback.

It will be appreciated that the computing devices described herein may be any suitable computing device configured to execute the programs described herein. For example, the computing devices may be a mainframe computer, personal computer, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A computer system for capturing and combining media data and geodata, comprising:
   a media data capture module configured to capture media data at a plurality of geographic locations along a path in a geographic area, and to store the media data in a media data stream;
   a geodata capture module configured to capture geodata identifying each of the plurality of geographic locations along the path at which the media data was captured with a longitude value and a latitude value; and
   a multiplexing module for interleaving the media data and the geodata as respective one or more media objects and one or more geodata objects into a composite file, wherein the composite file includes a header describing contents of the composite file, the header including identifying objects that identify the one or more media objects including the media data, and the one or more geodata objects including the geodata, and a body including the one or more media objects and the one or more geodata objects, wherein each of the geodata objects includes a stream number identifier and a media object identifier identifying a corresponding media object to which the respective geodata object relates;
   wherein the header includes parsing information to describe how to parse the body as a streaming file.

2. The computer system of claim 1, wherein the composite file is configured to be displayed on a graphical user interface.

3. The computer system of claim 1, wherein the composite file is a streaming file type or a downloadable file type.

4. The computer system of claim 1, wherein the media data includes video data and/or audio data.

5. The computer system of claim 1, wherein the geodata identifies one or more of a date, a time, a latitude, a longitude, and an altitude.

6. The computer system of claim 1, further comprising an extended data capture module configured to capture extended data to be combined with the geodata into the composite file.

7. The computer system of claim 6, wherein the extended data includes one or more of weather data, road condition data, traffic condition data, travel data, and keyword data.

8. The computer system of claim 6, further comprising a graphical user interface module configured to display a graphical user interface on a display, wherein the extended data is received by the graphical user interface and sent to the extended data capture module.

9. The computer system of claim 6, wherein the extended data is downloaded from a data service via a computer network by the extended data capture module.

10. A computing device configured to store media data and geodata in a composite file structure in non-volatile memory, the composite file structure comprising:
    a body including:
    one or more media objects including media data captured at a plurality of geographic locations along a path in a geographic area, and
    one or more geodata objects including geodata identifying each of the plurality of geographic locations with a latitude value and a longitude value, each of the one or more geodata objects corresponding to the one or more media objects, wherein the media data objects and the geodata objects are interleaved in the body of the composite file structure; and
    a header describing contents of the composite file and including objects identifying the one or more media objects and the one or more geodata objects, wherein each of the geodata objects includes a stream number identifier and a media object identifier identifying a corresponding media object to which the respective geodata object relates;
    wherein the header includes parsing information to describe how to parse the body as a streaming file.

11. The computing device of claim 10, wherein the one or more geodata objects each includes a latitude field for including the latitude value, and a longitude field for including the longitude value.

12. The computing device of claim 11, wherein each geodata object includes an altitude field for holding an altitude value which identifies an altitude of the geographic location.

13. The computing device of claim 10, wherein the geodata objects are interleaved with the media objects and then sliced into payloads and embedded into packets.

14. The computing device of claim 10, wherein the file format is structured as an Advanced Systems Format (ASF) data stream.

15. The computing device of claim 10, wherein the header includes a header object to identify the composite file as an ASF stream.

16. The computing device of claim 10 wherein the media data is in one of the following formats WMV, MPEG and AVI.

17. A method for combining geodata with media data, comprising: capturing media data at a plurality of geographic locations along a path in a geographic area;
    capturing geodata identifying each of the plurality of geographic locations with a longitude value and a latitude value; and
    interleaving the media data and the geodata as respective one or more media objects and one or more geodata objects into a composite file, wherein the composite file includes a header describing contents of the composite file, the header including identifying objects that identify the one or more media objects including the media data, and the one or more geodata objects including the geodata, and a body including the one or more media objects and the one or more geodata objects, wherein each of the geodata objects includes a stream number identifier and a media object identifier identifying a corresponding media object to which the respective geodata object relates;
    wherein the header includes parsing information to describe how to parse the body as a streaming file.

* * * * *